United States Patent
Moriyama et al.

[11] 3,967,075
[45] June 29, 1976

[54] ATTENDANT BOARD SYSTEM IN A TELEPHONE EXCHANGE

[75] Inventors: Hiromi Moriyama, Fujisawa; Motosuke Kuwabara, Yokohama, both of Japan

[73] Assignee: Hitachi, Ltd., Japan

[22] Filed: Jan. 15, 1974

[21] Appl. No.: 433,501

[30] Foreign Application Priority Data
Jan. 16, 1973 Japan.................................. 48-6648

[52] U.S. Cl................................. 179/98; 179/91 R
[51] Int. Cl.².......................................... H04Q 3/62
[58] Field of Search......... 179/18 EA, 18 GE, 91 R, 179/27 F, 98, 27 FH, 18 E, 18 AD, 27 CA, 42

[56] References Cited
UNITED STATES PATENTS

| | | | |
|---|---|---|---|
| 2,813,930 | 11/1957 | Berch | 179/27 CB |
| 2,872,528 | 2/1959 | Kaye | 179/18 F |
| 3,502,816 | 3/1970 | Gerke | 179/18 E |
| 3,542,961 | 11/1970 | Klein | 179/27 FH |
| 3,660,600 | 5/1972 | Lee, Jr. | 179/18 EA |
| 3,665,112 | 5/1972 | Blake | 179/99 |

OTHER PUBLICATIONS

"810A PBX Semiconductor Integrated Circuits and Hybrid Technology" by R. D. Burtness, International Conference on Communication, June, 1971, pp. 16-23 through 16-28.

Primary Examiner—Kathleen H. Claffy
Assistant Examiner—Joseph Popek
Attorney, Agent, or Firm—Craig & Antonelli

[57] ABSTRACT

An attendant board system in a telephone exchange in which when the direct connection type attendant board system is desired in connecting the office trunk and the attendant trunk, the office trunk and the attendant trunk are connected with each other directly, while when the channel access type attendant board system is desired, the office trunk and the attendant trunk are connected with each other through a channel switch frame. This change in the connection mode is performed by plugging in a direct connection type office trunk or a channel access type office trunk.

1 Claim, 5 Drawing Figures

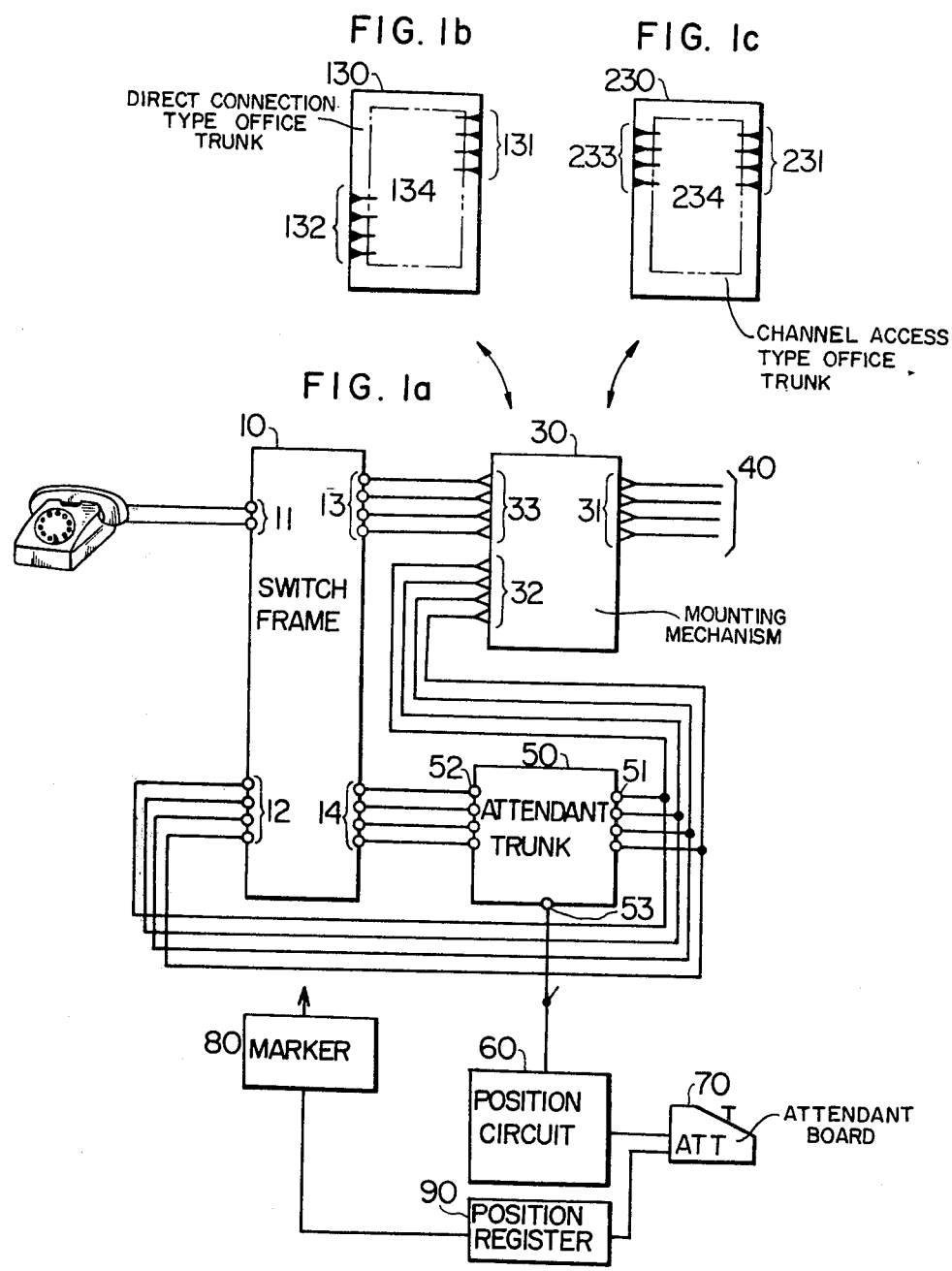

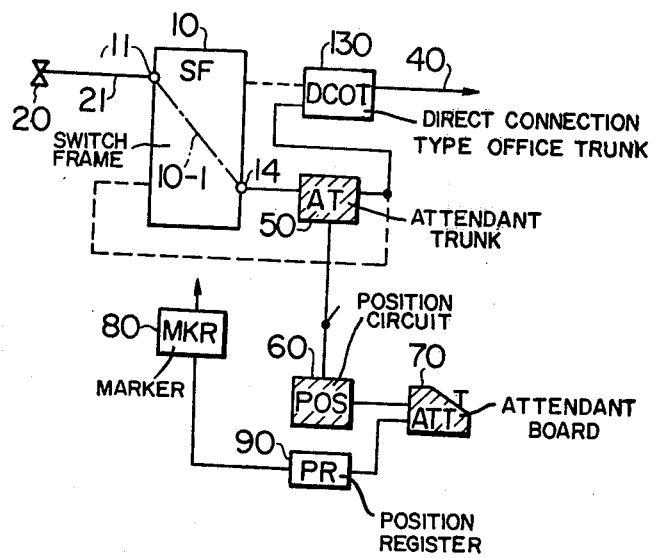
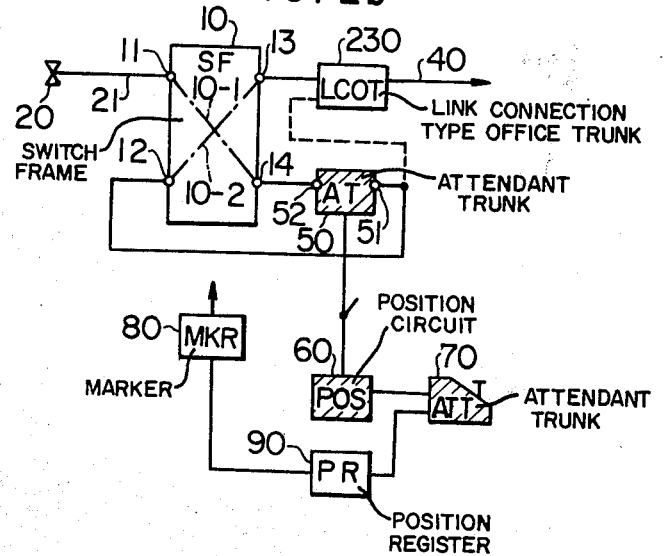

ATTENDANT BOARD SYSTEM IN A TELEPHONE EXCHANGE

The present invention relates to a telephone exchange, and more particularly to an automatic private branch exchange provided with an attendant board.

There are various scales of private branch exchanges of from several tens of lines to several thousands of lines. When an attendant board is provided to such a private branch exchange, a so-called direct connection type of attendant board system is adopted in which each office trunk is connected with a single attendant board for a relatively small scale of, for example, less than 200 lines of the private branch exchange from an economical standpoint of the apparatus. Though this system is simple, there is the inconvenience that when a plurality of attendant boards are provided, the operator of each attendant board cannot operate office trunks except the office trunk for that attendant board of the operator. When, after initially a small scale of private branch exchange provided with a direct connection type attendant board system is installed, it is to be developed into a medium or large scale one due to the increase in the number of terminals, it is necessary to replace it by a telephone exchange provided with a so-called channel access type attendant board system in which a plurality of attendant boards and a number of office trunks can be connected via links so that any office trunk can be operated from any attendant board.

In the past, when the attendant board system was to be changed from the direct connection type to the channel access type, it was necessary that not only the office trunks, the attendant boards and the position circuits should be replaced by others, but also position links different from the switch frame constituting the channels should be newly provided and new wiring should be made on a large scale.

Thus, the fact that it is necessary for attaining functions suitable for the increase in the terminals to refresh the functions by the replacement of the telephone exchange and associated installation and/or a large-scale rebuilding is a great economic and constructional disadvantage to the telephone exchange.

Consequently, an object of the present invention is to provide an attendant board system which is easy to change from the direct connection type to the channel access type.

Another object of the present invention is to provide a channel access type attendant board system which does not require position links.

Another object of the present invention is to provide an attendant board system which can be changed from the direct connection type to the channel access type and vice versa only by replacing the office trunk.

A further object of the present invention is to provide an attendant board system in which the mounting of the office trunk is of plug-in type so that it does not require substantial rewiring in changing from the direct connection type to the channel access type.

A feature of the present invention is that to the terminals on the office trunk side of the attendant trunk connected to the attendant board the direct connection type office trunk are connected directly, while the channel access type office trunk is connected through a switch frame.

Another feature of the present invention is that first jacks are connected to the main wires, second jacks connected to the terminals on the office trunk side of the attendant trunk, and third jacks connected to the terminals on the trunk side of the switch frame are provided at the position at which office trunk is installed, and the direct connection type office trunk is equipped with plugs at the positions corresponding to the first and second jacks and the channel access type office trunk is equipped with plugs at the positions corresponding to the first and third jacks.

The above and other objects, features and advantages of the present invention will become more apparent from the following detailed description of the preferred embodiment of the present invention when taken in conjunction with the accompanying drawings, in which:

FIGS. 1a to 1c are block diagrams of an automatic telephone exchange to which the present invention is applied; and FIGS. 2a and 2b are diagrams of arrangements of use of the automatic telephone exchange of FIGS. 1a to 1c.

First, referring to FIG. 1a, a switch frame 10 composed of crossbar switches or the like has paths connecting one of a number of line side terminals 11 and 12 and one of a number of trunk side terminals 13 and 14. To the line side terminals 11 of the switch frame 10 are connected subscriber's lines 21 extending to subscriber's stations or telephones 20. A mounting mechanism 30 of the office trunk has jacks 31 connected with main wires 40, jacks 32 connected with office trunk side terminals 51 of an attendant trunk 50, and jacks 33 connected with the trunk side terminals of the switch frame 10. The office trunk side terminals 51 of the attendant trunk 50 are also connected with the line side terminals 12 of the switch frame 10. The switch frame side terminals 52 of the attendant trunk 50 are connected with the trunk side terminals 14 of the switch frame 10, and the operator side terminals 53 of the attendant trunk 50 are connected with a position circuit 60 which in turn is connected with an attendant board 70. Reference numeral 80 designates a marker for controlling the exchange, and reference numeral 90 designates a position register for sending information from the attendant board 70 to the marker 80.

The office trunk mounting mechanism 30 is equipped with an office trunk 130 for a direct connection type attendant board system of FIG. 1b or an office trunk 230 for a channel access type attendant board system of FIG. 1c. The direct connection type office trunk 130 is equipped with plugs 131 and 132 at the positions corresponding to the jacks 31 and 32 of the office trunk mounting mechanism 30. The plugs 131 and 132, though no detail is shown, are connected with an office trunk circuit 134 similar to a conventional one. The channel access type office trunk 230 is equipped with plugs 231 and 233 at the positions corresponding to the jacks 31 and 33 of the office trunk mounting mechanism 30. The plugs 231 and 233 are connected with an office trunk circuit 234.

By the above construction the attendant board system becomes naturally a direct connection type one or a channel access type one depending on whether the office trunk 130 or the trunks 230 is mounted on the office trunk mounting mechanism 30. That is, when the direct connection type office trunk 130 is mounted, the direct connection type attendant board system shown in FIG. 2a is provided, while when the channel access type office trunk 230 is mounted, the channel access type attendant board system shown in FIG. 2b is provided. In FIGS. 2a and 2b the path shown by the broken line indicates that it is not used in each case.

Next, the operations of the arrangements of FIGS. 2a and 2b will be described. In FIG. 2a, when a call is received by the office trunk 130 from the main wire 40, the attendant board 70 provides an indication to that effect. Then, when an operator performs an operation responding to the terminating main wire, the attendant board 70 is connected to the terminating office trunk 130 through the position circuit 60 and the attendant trunk 50 corresponding to the terminating main wire 40 to enable the operator to respond to the incoming call from the main wire 40. If the incoming call is for an extension subscriber 20, the operator operates the attendant board 70 to send the telephone number of the subscriber 20 to the marker 80 through the position register 90. The marker 80 controls the switch frame 10 to establish the channel 10-1 between the attendant trunk 50 and the subscriber's line 21. The operator performs an operation for sending a calling signal to the subscriber 20, and, if the subscriber 20 responds thereto, informs him of the presence of the incoming call from the main wire. Then, the operator operates the attendant board 70 to reset the position circuit 60 in order to make a call possible between the main wire 40 and the subscriber 20.

In FIG. 2b, when an incoming call is received by the office trunk 230 from the main wire 40, the attendant board 70 provides an indication to that effect. If the operator performs a response operation, the position circuit 60 seizes an idle attendant trunk 50 to send the position information of the line side terminal 51 of the attendant trunk 50 and the number information of the office trunk 230 which has received the call to the marker 80. The marker 80 connects the office trunk 230 to the attendant trunk 50 through a channel 10-2. Thus, the office trunk 230 is connected to the office trunk side terminal 51 of the attendant trunk 50. Consequently, the subsequent operation is the same as in the arrangement of FIG. 2a.

What is claimed is:

1. In an attendant board system in a telephone exchange which may be selectively adapted for either direct connection type office trunk communication or channel access type office trunk communication between a switch frame and an attendant trunk to a central office provided with:
  a. a switch frame having two groups of trunk side terminals and a group of line side terminals;
  b. an attendant trunk having switch frame side terminals and office trunk side terminals respectively connected with one group of each of the trunk side terminals and the line side terminals of the switch frame; and
  c. an attendant board connected with an attendant trunk and controlling the operation thereof, wherein the improvement comprises:
  d. an office trunk mounting mechanism having first connector means connected with an office line, second connector means connected with the trunk side terminals of the switch frame, and third connector means connected with the office trunk side terminals of the attendant trunk; and
  e. a first office trunk having a first office trunk circuit, and first and second connector means both connected therewith at the positions corresponding to the first and second connector means, respectively, of the office trunk mounting mechanism, for providing a channel access type attendant board system; and
  f. a second office trunk having a second office trunk circuit, and first and second connector means both connected therewith at the positions corresponding to the first and third connector means of the office trunk mounting mechanism, for providing a direct connection type attendant board system.

* * * * *